Oct. 16, 1951　　　E. W. HUDSON ET AL　　　2,571,882
COMBINATION BUCK RAKE AND STACKER
Filed Aug. 9, 1948　　　7 Sheets-Sheet 1
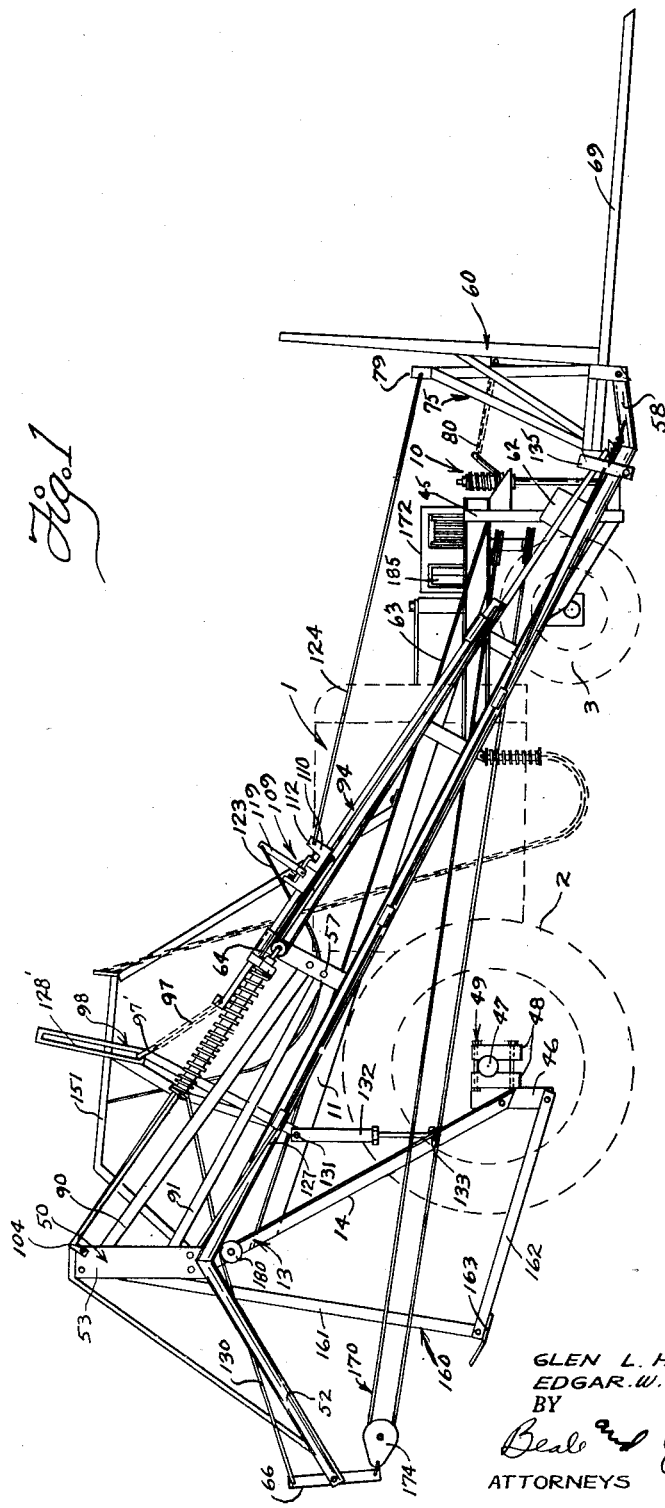
INVENTOR.
GLEN L. HUDSON
EDGAR W. HUDSON
BY
ATTORNEYS

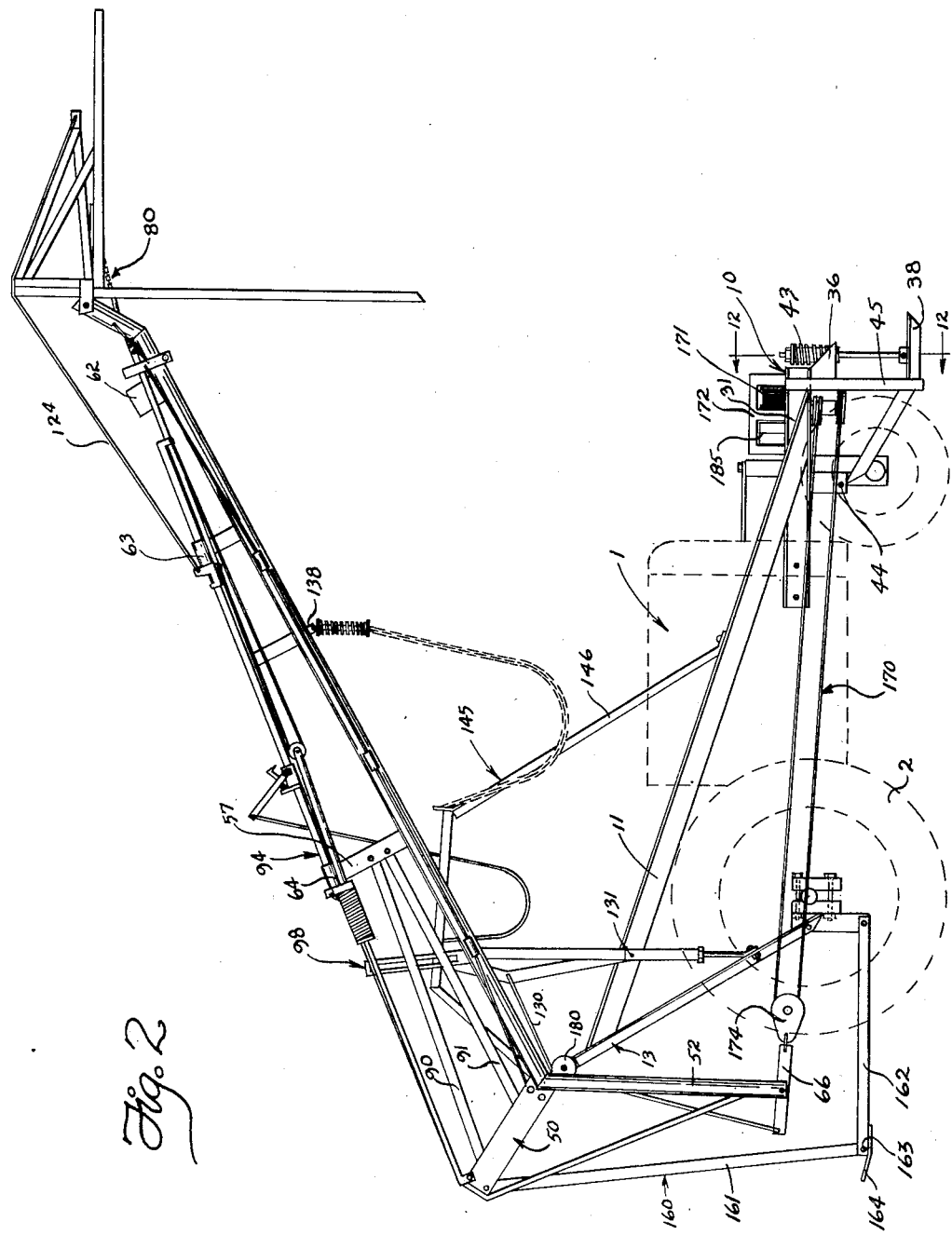

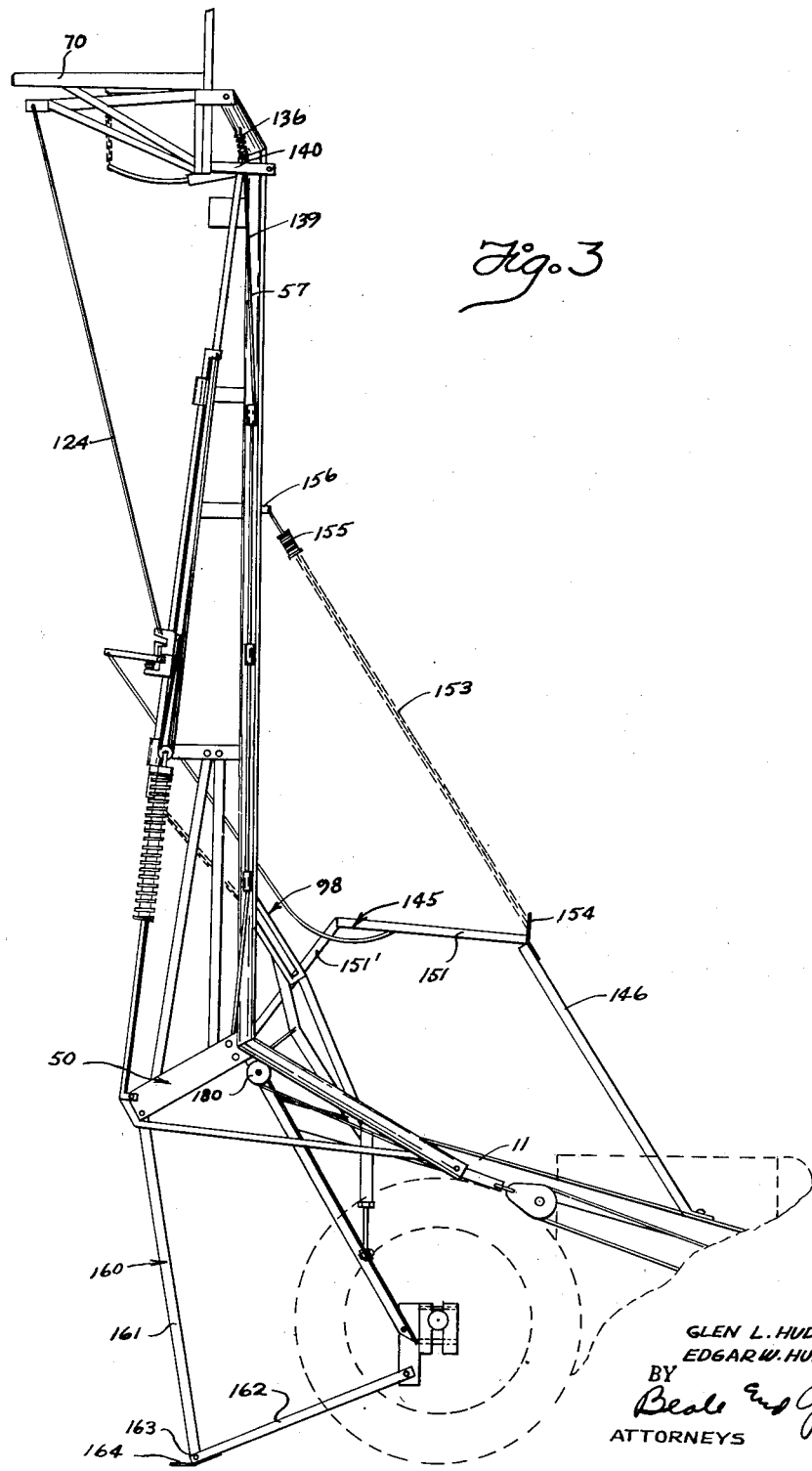

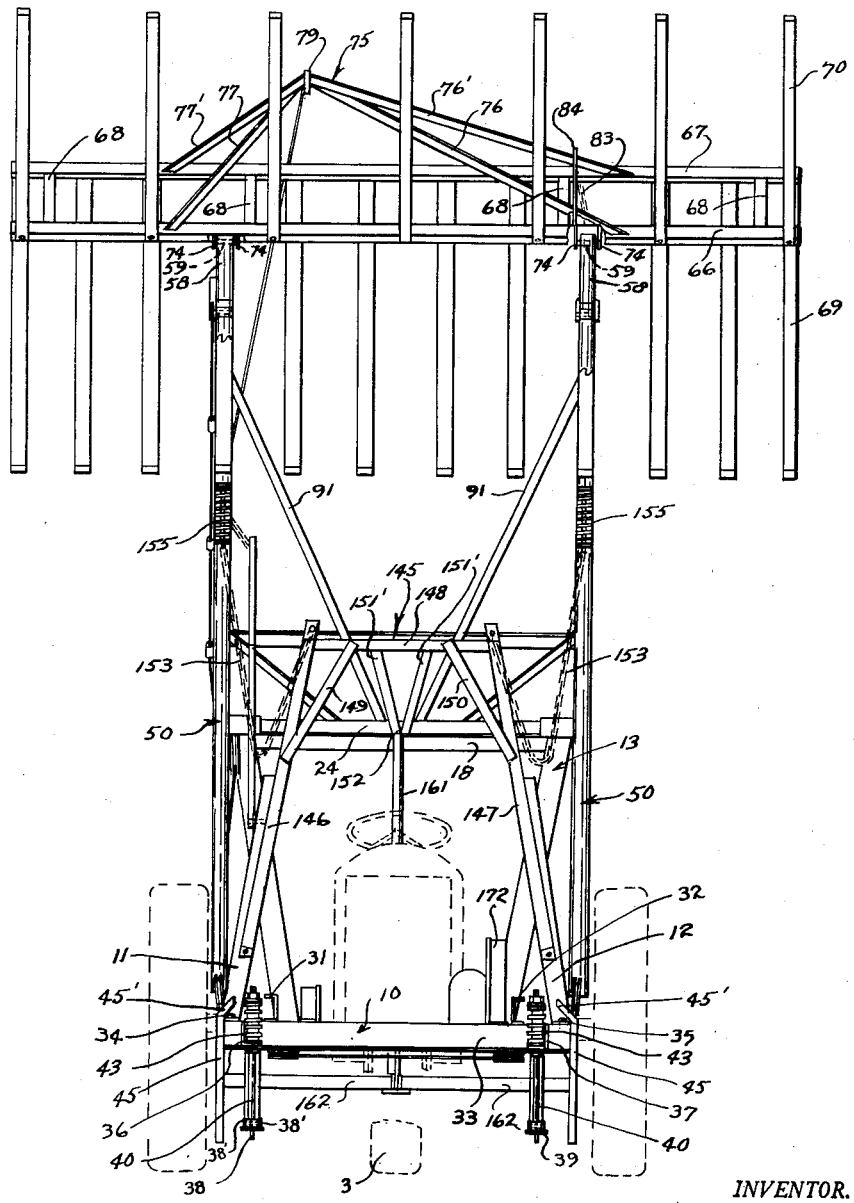

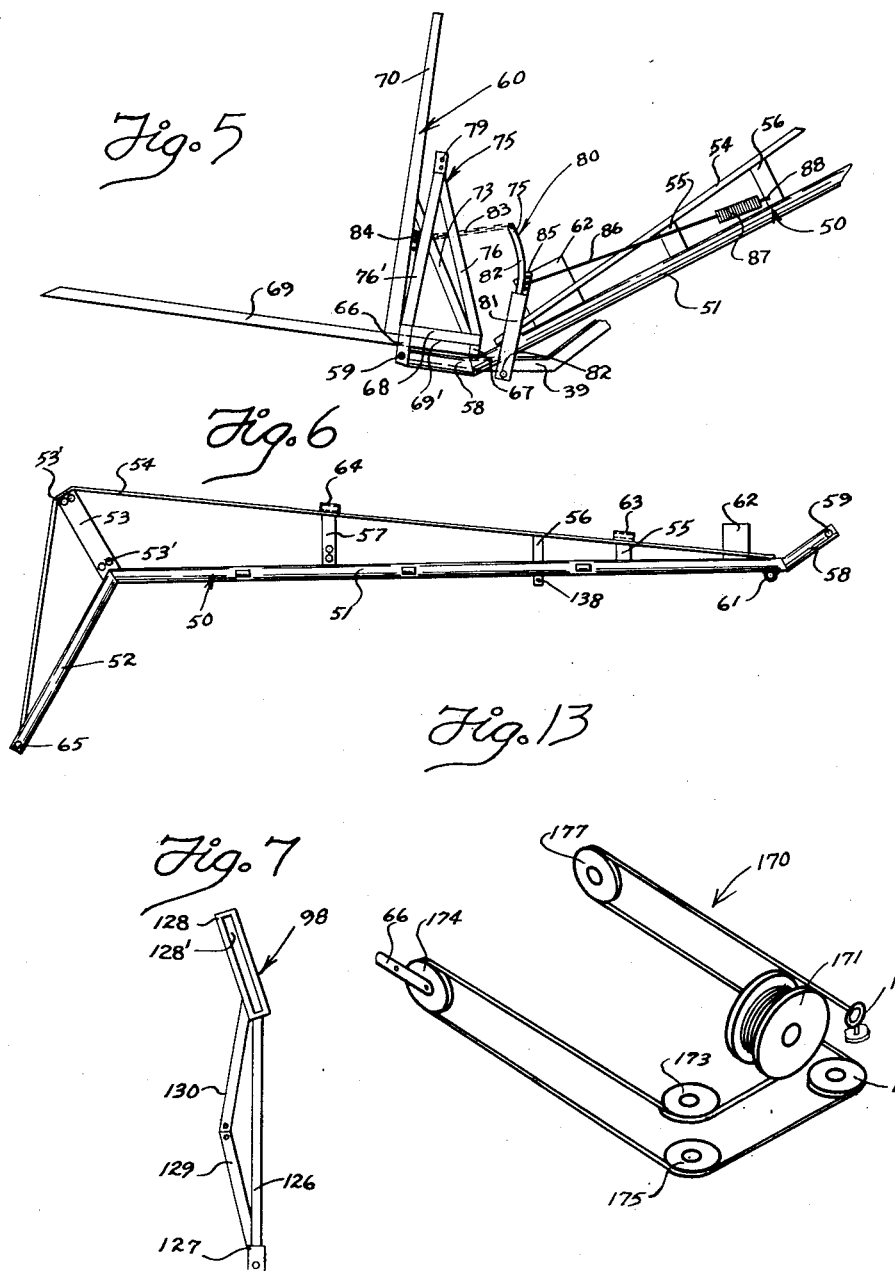

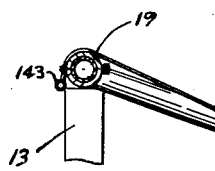
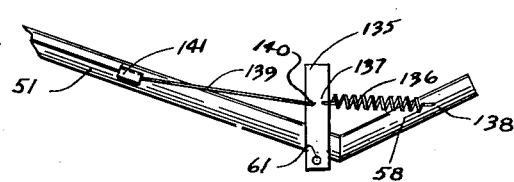
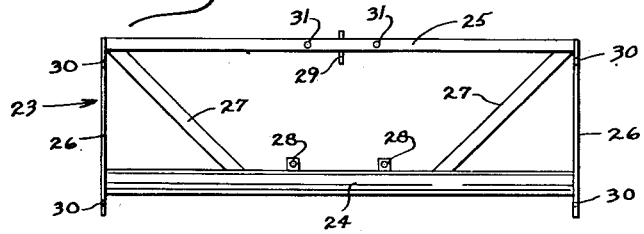
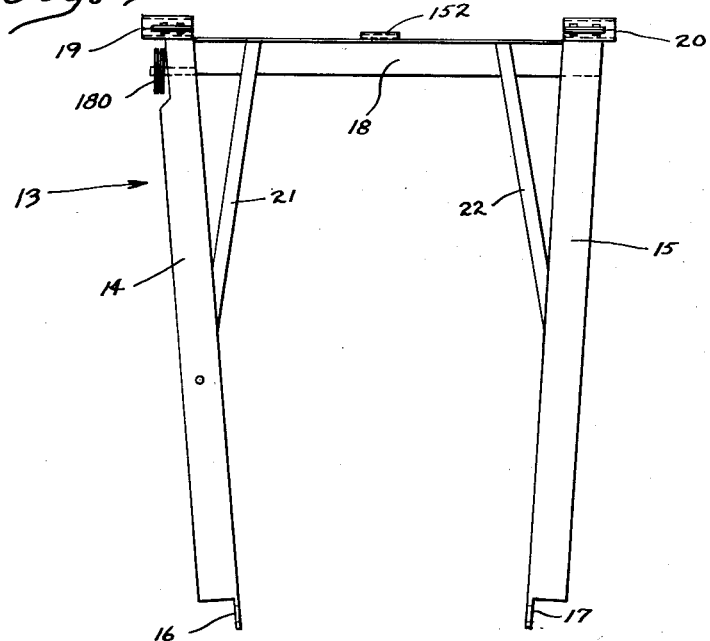

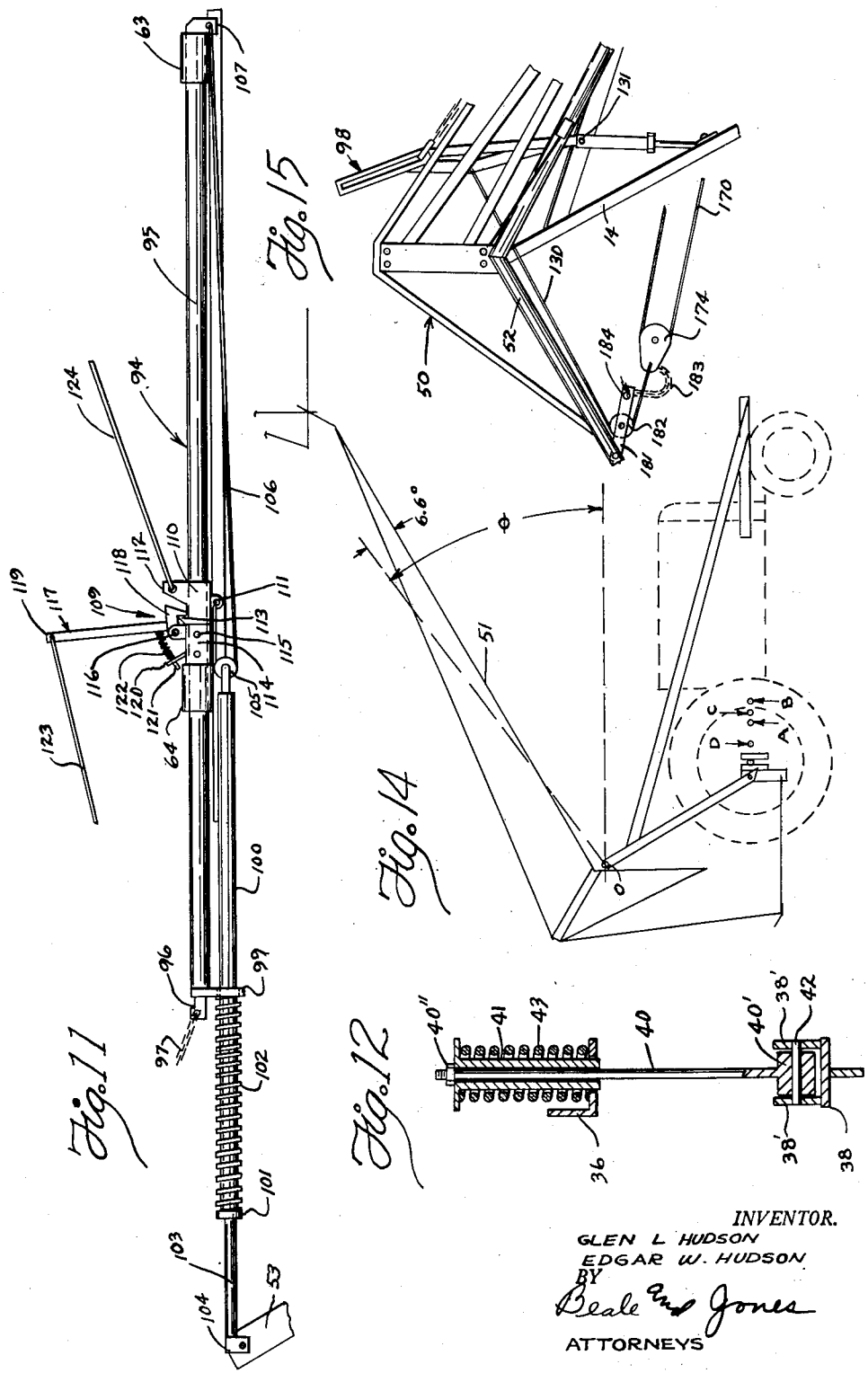

UNITED STATES PATENT OFFICE 2,571,882

COMBINATION BUCK RAKE AND STACKER

Edgar W. Hudson and Glen L. Hudson,
Meridian, Idaho

Application August 9, 1948, Serial No. 43,256

16 Claims. (Cl. 214—140)

This invention relates to a combined push rake and hoist and particularly to an apparatus to be mounted on a conventional farm tractor for gathering and stacking material such as hay.

An important object of this invention is to provide novel means for gathering a load of material in a hay basket or receptacle with an arrangement of elements which permit the use of pivotal supports so suspended as to place the load during gathering, hauling and conventional stacking forward of the center of gravity of the tractor, while at the same time such arrangement of elements permits overshooting or catapulting the load at the rear of the tractor and at a point considerably to the rear of the center of gravity of the whole combination of tractor and mounted hoisting elements.

A further object is to provide a single operating control which will tilt the basket forward or backward when in its lowest position, raise or lower the basket to conventional dumping position forward of the tractor, raise the basket to vertical overshot position for catapulting the load to the rear of the tractor and lower the basket from such vertical position.

A further object is to provide such an apparatus wherein the rake or basket comprises substantially horizontal sweep rake teeth and pitcher teeth arranged vertical thereto, and to provide automatic means for maintaining such portions of the rake or receptacle structure in normal position until it is desired to dump the material therefrom at the forward end of the tractor.

A further object is to provide novel, easily operable means for dumping the material from the receptacle and for returning the receptacle to normal position to reset such structure.

A further object is to provide novel means for automatically tilting the basket or receptacle backwards as it approaches the vertical overshot position, thus transferring the load in the basket from the sweep rake teeth to the normally vertical pitcher teeth which are now horizontally positioned.

A further object of the invention is to provide novel means for automatically arresting the backward tilting movement of the receptacle in vertical overshot position.

A further object of the invention is to provide novel resilient saddle means at the forward end of the tractor on which the back or head portion of the material receptacle may rest when the tractor is moved so that the load may be smoothly transported over rough ground.

A further object of the invention is to provide stabilizing means which automatically come into ground engaging position at the rear of the tractor when the material receptacle is raised to vertical overshot position so as to transfer to the ground a part of the forces acting on the arms supporting the receptacle and acting within the whole structure.

A further object of the invention is to provide a structure of this character wherein the elements may be so constructed and located that the center of gravity for the combined structure, including the tractor, lies forward of the rear axle of the tractor for all positions of the swing of the receptacle from ground to vertical overshot position, thus providing a stable and safe operating structure.

A further object of the invention is to provide for the application of force for controlling the swing of the receptacle at a relatively low point on the apparatus and to have such force act in a substantially horizontal plane.

A further object of the invention is to provide a compact receptacle trip and return assembly and mounting on which control forces may be superimposed for tilting the receptacle separate from a tripping and dumping action.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

In the following detailed description of the invention, reference is had in the following drawings which form a part hereof. Like numerals refer to like parts in all views of the drawings and throughout the description.

In the drawings:

Fig. 1 is a side view of the stacker and loader mounted on a tractor with the derrick arms and basket in lowered position;

Fig. 2 is a further side view showing the derrick arms elevated to about 45 degrees while the hay basket is shown in a full dumped position;

Fig. 3 is still a further side view showing the derrick arms vertically elevated with the basket carried to overshot position and the stabilizer in ground engaging position;

Fig. 4 is a front view with the derrick arms elevated to a position shown in Fig. 2 with the basket in mid-dumping position;

Fig. 5 is a side view of the forward end of the derrick arms with the basket tilted so that its head portion rests on head rest saddles;

Fig. 6 is a side view of the right derrick arm;

Fig. 7 is a side view of the stacker overshot control arm and basket leveler;

Fig. 8 is a detail side view of the overshot stool with its control cable and mounting on the right derrick arm;

Fig. 9 is a front view of the derrick axle frame support;

Fig. 10 is a plan view of the derrick axle frame;

Fig. 11 is a side view of the trip assembly;

Fig. 12 is an enlarged sectional view along line 12—12 of Figure 2 showing the support mounting for the forward ends of basket head rest saddles;

Fig. 13 is an isometric line diagram of the power cable connections for raising and lowering the derrick arms;

Fig. 14 is a line diagram of the tractor having the derrick frame elevated to a mid position as in Figure 2, and with various center of gravity locations indicated for the apparatus as will be described more fully in the specification; and Fig. 15 is a modified form of evener bar or take-up means at the lower end of the right derrick arm.

Referring to Figures 1 and 2, a conventional tractor is generally indicated at 1 having rear drive wheels 2—2 and a forward support and steering wheel 3. The position of the driving controls is located intermediate the rear wheels 2—2 of the tractor.

The supporting framework for the stacker comprises the front assembly generally indicated at 10 in Fig. 4, the right and left derrick braces 11 and 12, best shown in Figures 2 and 4, and the derrick axle frame support assembly generally indicated at 13 in Figures 4 and 9.

The derrick axle frame support 13, as shown in detail in Figure 9, comprises a right leg 14 and a left leg 15, each of which is apertured at its lower end at 16 and 17 respectively for attachment to the tractor frame. The right and left legs 14 and 15 are interconnected at their upper ends by cross member 18 on which is mounted at either end bearings 19 and 20 in which is pivotally supported the derrick axle frame shown in detail in Fig. 10. Diagonal brace members 21 and 22 interconnect the top cross member 18 respectively with the right and left legs 14 and 15.

Referring now to Fig. 10, the derrick axle frame is generally indicated at 23 and comprises a tubular lower member 24 and upper cross member 25 connected to the tubular member 24 by the end plates 26—26. This derrick axle frame 23 is pivotally supported on the derrick axle frame by means of its tubular cross member 24 being mounted in bearings 19 and 20. Suitable diagonal braces 27—27 connect the tubular member 24 and the upper cross member 25 to provide a rigid frame construction. The tubular cross member 24 has secured thereto two lugs 28—28 which are apertured and serve as connecting elements for sway braces to be described later. The upper cross member 25 has welded thereto a depending plate 29 for pivotal attachment of a stabilizer which is described later. The end plates 26—26 each have four apertures as indicated at 30 for receiving bolts which attach the right and left derrick arms, shown in detail in Fig. 6. The upper cross member 25 is apertured at 31—31 for attachment of the sway braces.

The front assembly generally indicated at 10 in Figures 2 and 4 is supported by channel members 31 and 32 bolted onto each side of the tractor frame. A cross member 33 is bolted to and supported by the outer ends of the channel members 31 and 32. At each end of the cross member 33 the forward ends of the derrick arms 11 and 12 are connected by bolts 34 and 35. Derrick arm guards 45—45 are welded to the ends of cross member 33 and are formed with inwardly and upwardly extending barrier portions 45'—45' at their upper ends which serve as guides for guide plates on the forward ends of the derrick arms. Forwardly extending brackets 36 and 37, welded to the front face of the cross member 33 towards its ends, serve as supports for the forward ends of saddles 38 and 39 which support the head of the hay basket to be described later.

Referring to Fig. 12 there is shown in detail a cross section of the spring mounting connection which supports the forward ends of the saddles 38 and 39. Bracket 36 is apertured to receive for sliding engagement, the saddle spring guide 41 which is a tubular member having a flanged top. Saddle adjusting rod 40, having its upper end threaded, extends upwardly through the guide 41 while its lower end is formed with an eye 40' which is pivotally connected by pin 42 with two upwardly extending spaced ears 38' welded to the forward and upper surface of saddle 38. A compression spring 43 is carried by the spring guide 41 and extends between the flanged portion of the guide and the upper adjacent surface of bracket 36. Vertical adjustment is obtained by the securing nut 40'' on the threaded end of adjusting rod 40. This arrangement provides resilient support for the head or back portion of the hay basket or material receptacle shown at 60 in Figures 1 and 5.

Referring to Fig. 1, the derrick axle frame support, generally indicated at 13, has the lower ends of its right and left legs 14 and 15 bolted to an angle bar 46 detachably secured to the tractor axle 47 by means of pillow blocks 48—48 and through bolts 49. The upper ends of derrick braces 11 and 12 are bolted to the legs 14 and 15 of the derrick axle frame support, thereby holding it in a stationary position.

The main derrick arms, generally indicated at 50, are shown in detail in Fig. 6. These arms are built up to form a composite obtuse angular shaped structure, each of which comprises base members 51 and 52 preferably pipes of about 2½ inches in diameter. Base member 52 is welded to the left end of base member 51 and extends at an angle of about 120° therewith. A plate 53 is welded to the outer juncture of base members 51 and 52 and has four spaced holes indicated at 53' through which extend bolts to secure the derrick arms to the end plates 26—26 on the derrick axle frame 23, previously described. A stay rod 54 extends over and is welded to the outer end of plate 53 and has its ends welded to the ends of base members 51 and 52. Braces 55, 56, and 57 connect base member 51 at suitably spaced intervals with the stay rod 54. A support end member 58 for the hay basket is welded to the other end of base member 51 and extends at an angle of about 145° with base member 51 in a direction nearly opposite to the base member 52, thereby permitting the forward ends of the derrick arms to more readily slide over the surface of the ground when in ground engaging position. The supporting member 58 is apertured at 59 and provides a pivotal mounting for the basket assembly generally indicated at 60 in Fig. 1. A tubular member 61 extending transversely to the base member 51 and welded thereto at its right end forms a pivotal mounting on the right derrick arm for a stool to support the hay basket's head in overshot position. On the left derrick arm, this member 61 serves as a pivotal mounting for a basket latch lever rod, described later. Towards the outer ends of each of the derrick arms there is secured, as by welding, an upwardly extending guide plate 62 which cooperates with the derrick arm guards 45—45 of the front assembly. On the right derrick arm there is additionally attached guide mountings 63 and 64 for supporting the trip assembly, shown in detail in Fig. 11. At the outer end of the base member 52 an aperture 65 is provided for securing an evener bar 66, see Figures 2 and 15.

The right and left derrick arms, generally indicated at 50, see Figures 1 and 2, are bolted to the end plates 26—26 of the derrick axle frame, see Figure 6, which is pivotally supported by the derrick axle frame support generally indicated at 13. A pair of diagonal sway braces 90 and 91 have their lower ends bolted to brace member 57 of each derrick arm. The upper end of brace 90 is bolted at 31 to upper cross member 25 of the derrick axle frame 23, see Figure 10, while the upper end of brace 91 is secured to the lug 28 affixed to the pivotal cross member 24 of the derrick axle frame. By this mounting and bracing arrangement, the derrick arms 50 pivot about the upper end of the derrick axle frame support 13.

Referring to Figures 4 and 5, the hay basket or sweep rake receptacle, generally indicated at 60, is pivotally mounted on the ends of the support arms 58 on the ends of derrick arms 50. The basket is built up around a base framework of angle irons welded together and comprising spaced cross members 66 and 67 which are connected by four transverse members 68. Sweep rake teeth 69 extend transverse to and on the underneath side of cross members 66 and 67 where they are attached by bolts at their rear end portions 69' to form the head of the basket which in Figure 4 is shown resting on head rest saddle 39. Pitcher teeth 70 extending upwardly and at right angles to the sweep rake teeth 69 are bolted at their lower ends to the forward edge of cross member 66. Pitcher teeth 70 are given additional support by rear braces 73 which extend from about the mid-portion of the pitcher teeth rearwardly and downwardly to the rear cross member 67 of the base frame. The basket is pivotally connected at 59 on the ends of support arms 58 by suitable pins extending through pivot plates 74 welded to the underneath side of cross member 66, as shown by the broken away section in Fig. 4.

A basket trip attachment framework, generally indicated at 75, comprises four upwardly and diagonally extending members 76, 77, 76' and 77' which have their upper ends converging and welded to a plate 79 while their lower ends are connected to the cross members 66 and 67, as best shown in Figure 4. Plate 79, positioned to the left of the center of the hay basket, serves as an attachment for the basket trip rod to be described later.

A basket return lever, generally indicated at 80, has a U-shaped base member 81 pivotally connected at its lower end at 82 to the lower end of the base support 51 of left derrick arm 50. Attached to the upper end of the U-shaped member 81 is a forwardly extending arc shaped rod 82' apertured at its end to receive a connecting chain 83 attached to a vertically extending bracket 84 on the hay basket. This basket return lever 80 has fixed to its rear portion an apertured bracket 85 to which is pivotally connected the lower end of a basket return link 86 whose upper end is attached to a basket return tension spring 87 anchored at 88 on the left derrick arm 50. It will be noted that this basket return lever applies force at the right of center of the hay basket, see Figure 4, to return the basket to normal upon its being tripped. Force to return the basket after trip is also applied to the basket trip attachment frame work 75, previously described.

The trip assembly for overshot generally indicated at 94 is shown in detail in Fig. 11. This trip assembly is slidably mounted on the upper forward portion of the right derrick arm 50 by means of the mounting guides 63 and 64, as previously described and shown in Fig. 6. This trip assembly serves to control the hay basket both for stacking operations and overshot operation of the derrick arms. By its being slidably mounted it also serves to tilt the hay basket in response to force applied and released at the evener bar 66, see Fig. 2. The trip assembly 94 comprises a guide shaft 95 having slidable movement in mounting brackets 63 and 64. The upper or left end of guide shaft 95 has connected thereto at 96, the lower end of the connecting chain 97 leading to a slot in the overshot control arm generally indicated at 98 in Figure 1, and shown in detail in Fig. 7. Also at the upper or left end of the guide shaft 95 is affixed a transversely extending slide 99 apertured to receive for sliding engagement spring guide or basket trip shaft 100, which is of tubular form and has affixed to its left end a flange plate 101. Surrounding the spring guide 100, is a compression spring 102, whose left end bears against the end flange 101 of spring guide 100, while its right end bears against guide plate 99. This compression spring is compressed as the basket is dumped by gravity and serves to return the basket to normal position after dumping. Extending into the left end of the spring guide 100, is an end guide 103, in the form of a rod having a bracket 104 fixed to its upper or left end and which is secured to plate 53 on the right derrick arm 50, see Fig. 1. The right end of the spring guide 100 has attached thereto, by means of a suitable bracket, a small pulley 105, over which is run a cable 106. One end of cable 106 is secured in a depending lug 107 affixed to the lower or right end of guide shaft 95 while the other end is attached to a depending lug 111 on the slidable portion 110 of a basket latch generally indicated at 109. Portion 110 of the basket latch is in the form of a collar slidably mounted on guide shaft 95 and having besides the above described depending lug 111, an upstanding lug 112 and a shoulder 113 for receiving a dog 118 on the standing portion of the latch 109. The standing portion of the latch 109, indicated at 114, is a collar which fits over and is secured to guide shaft 95 as by rivets 115. Collar 114 has an upstanding lug 116 at its right end which serves as a pivotal mounting for a latch generally indicated at 117. Latch 117 is formed with an upstanding lever arm 119 and a dog 118 which engages shoulder 113 on slide 110. At the rear or left end of collar 114 is attached a guide plate 120 which is apertured to receive for sliding engagement an arc-shaped rod 121 welded to and movable with lever 119. A compression spring 122 is mounted on rod 121 and extends intermediate guide plate 120 and lever 119 urging lever 119 clockwise to hold dog 118 in locking position. At the upper end of lever 119 is pivotally connected a hand control trip line 123 which is secured to the overhead cab structure, as shown in Figure 1. A control rod 124 has its left end pivotally connected to the lug 112 on the slidable portion 110 of the latch 109 while its right or lower end is pivotally connected to the plate 79 on the basket trip attachment frame 75. When dog 118 is released from shoulder 113, the slide 110 slides forward on the guide 95 and allows the basket to dump, whereby spring 102 is compressed.

The overshot control arm, generally indicated at 98, in Figures 1 and 7, is shown in detail in Figure 7. This control arm is made up of a main member 126 provided with a pivot mounting plate 127 at its lower end. At the upper end of member 126 is attached a slotted plate 128 having a slot 128' which extends throughout its length at an angle of about 160° with main member 126. Diagonal brace members 129 and 130 interconnect plate 128 and pivot end 127 of main member 126. The juncture of the diagonal members 129 and 130 serves as a connecting point for the basket leveling cable 130, see Figure 2. The overshot control arm generally indicated at 98 is mounted at its pivot end 127 on the right derrick brace 11 by a pivot pin 131.

A pivot support for the overshot control arm 98 is provided as shown in Figures 1 and 2. This pivot brace 132 extends from pivot pin 131 on the right derrick brace 11 to the right leg 14 of the axle frame support, as shown at 133.

Referring now to Figure 8, there is shown a detail assembly of the overshot stool and its cable mounting. Parts of the right derrick arm 50 are shown here, namely, the main support arm 51, its end supporting member 58, and the pivot mounting 61. The overshot stool, as indicated at 135, is U-shaped in form and pivotally mounted at 61 to the base member 51. A spring 136 has one end attached to the stool 135 at 137 while its other end is pivotally anchored to the support element 58 as at 138. This spring 136 tends to pivot the stool 135 in a clockwise direction. Cable 139 has its lower end secured pivotally to the stool 135, as at 140, and is led upwardly through guides 141 and 142 on arm 51 over bearing 19 mounted on the derrick axle support frame 13 where its upper end is secured to frame 13 at 143. The function of the stool is to prevent the basket 60 from pivoting backward or counterclockwise when the derrick arms are elevated to an overshot position with a load, as shown in Figure 3. When the arm 51 is down ready to pick up a load, the cable passes around the bearing 19 and pulls the stool 135 in a counterclockwise direction about its pivot 61, as shown in Figure 1. The stool 135, as shown in Figure 1, is out of the way of head portion of the basket 60; however, if the arms are raised the cable is unwound from the bearing 19 allowing the tension spring 136 to pull the stool clockwise into position under the head of the basket, as shown in Figure 3. This prevents the basket from tipping backwards and dropping the load.

A cab shield generally indicated at 145, see Figures 3 and 4, is made up of a framework and forms a barrier over the driver for his protection. It comprises two forwardly extending legs 146 and 147 having their lower ends bolted to the right and left derrick braces 11 and 12. The upper ends of these legs are interconnected by a cross member 148 which is further supported by braces 149 and 150 extending diagonally to each of the legs 146 and 147. A pair of top cross members 151—151 having rearwardly and downwardly extending end portions 151' extend from the upper ends of legs 146 and 147 to plate 152 at the middle of cross member 18 on the derrick axle frame support 13.

Overshot control chains, as indicated at 153—153 in Figures 3 and 4, have their lower ends connected to a flange 154 attached to the cab 145, while their upper ends are connected to a spring 155 which has its upper end pivotally connected to a lug 156 depending from main member 51 of derrick arm 50. When the derrick arms and the basket are overshot, the overshot control chains and the springs tend to limit the overshot travel of the derrick arms.

A stabilizer assembly for the derrick arms is generally indicated at 160, see Figures 2 and 3. Upright member 161 of the stabilizer is pivoted at its upper end in the center of derrick support frame 23, see Figure 10, at 29 on its top cross member 25. Two steadying braces 162—162 are pivotally connected at their lower ends to the lower end of upright member 161 at 163. A ground engaging shoe in the form of a plate whose rear end is bent upwardly is welded to the lower end of upright member 161 of the stabilizer.

The power cable system is generally indicated at 170 in Figure 13. A power reel 171 is mounted at the forward part of the tractor on a support frame 172 which is supported by cross member 33, see Figures 1 and 4. From the power reel the cable passes to the front right side of the tractor over pulley 173, rearward to and over pulley 174 pivoted to evener bar 66, see Figures 1 and 2, thence forward to the front lower side of the tractor over pulley 175, across the front of the tractor over the left lower pulley 176, then rearward to and over pulley 177, pivotally attached to the lower pivot point 65 on the left derrick arm 50, thence forward to 178 on the left derrick brace 12 where it is dead ended.

The overshot control arm 98, see Figures 1, 2 and 3, is pivoted counterclockwise about its pivot 131 by means of a pull applied to cable 130. Cable 130 is led over a sheave 180, pivotally mounted on the upper end of right leg 14 of derrick axle frame 13, to one end of evener bar 66, pivotally mounted on the end of support member 52 of the right derrick arm. A pulley block 174 is pivotally connected to the other end of evener bar 66. Force applied through the cable system 170 connected to block 174 first tends to pivot the evener bar 66 about its pivotal mounting into a substantially horizontal plane in which the applied force lies. As a pull is applied to the lower end of cable 130, it pivots overshot control arm 98 counterclockwise. Further application of force will now swing the derrick axle frame counterclockwise and in turn control arm 98 will also be rotated counterclockwise.

The first force applied to rotate evener bar 66 is transmitted through the control arm 98, the slidably mounted trip assembly 94, basket control cable 124 which tilts the basket backward on its pivotal mounting. As this first application of force to the evener bar 66 is released, the basket will tilt forward under the influence of gravity. This action of tilting the basket 60 is particularly useful when the basket is in its lowest position as in Figure 1. By this tilting movement of the basket, its sweep rake teeth 69 may be moved into and out of ground engaging position. It is to be noted that the same force means which tilts the basket 60, as described above, is used to swing the derrick frame supporting the basket. Thus, one single control of the applied force, generally indicated at 170, is used to tilt and swing the basket.

In Figure 15 there is shown a modified form of evener bar at 181 which has one end pivotally mounted to the end of the right derrick arm 50. A sheave 182 is pivoted intermediate the ends of evener bar 181 and has led over it cable 130, the lower end of which is attached to pulley block 174. An adjusting chain 183 has one end connected to pulley block 174 while its other end is adjustably connected to the free end of evener bar 181, as at 184. As a pull is applied to the pulley block 174, it first takes up on cable 130, and then the connecting chain 183 takes over to apply a pull to rotate the derrick arm 50.

Referring now to Figure 14 there is shown diagrammatically the whole structure. While a mid-position of swing of the derrick frame is shown, the centers of gravity of the combined structure and tractor have been indicated for the derrick frame at its lowest, middle and highest positions of swing.

*Operation*

Power is supplied through a conventional power take off and clutch, not shown, on the tractor to drive the reel 171. A brake generally indicated at 185, see Figure 1, controls the power reel when lowering the derrick frame. While the power reel has been shown mounted at the forward end of the tractor, a power reel mechanism can be mounted at the rear of the tractor on suitable support frames attached to the draw bar.

When it is desired to use the rake as a sweep rake, the basket or receptacle 60 is tilted forward under its own weight by allowing reel 171 to pay out cable. This permits the evener bar or take up 66 to pivot clockwise, and cable 130 leading to the overshot control arm 98 is pulled forward by the pull exerted through the basket's forward rotation. The control cable 124 leading from the basket control arm 75 pulls the slidably mounted trip assembly 94 forward. Basket trip 109 is at all times locked unless it is desired to dump a load from the basket. The downward sliding movement of the trip assembly 94 is transmitted to the overshot control arm 98 by means of chain 97, connected at the top of the trip assembly, and the connecting link 97¹, the latter of which slides in the slot 128¹ on the overshot control arm. Cable 130 which has been slackened allows the control arm 98 to pivot forward. To tilt the basket backward, it is merely necessary to apply power to the cable system 170 and the evener bar 66 exerts a pull on cable 130 to reverse the pull on the overshot control arm 98.

To raise the derrick arms, power is continued to be applied on the evener bar 66 which pulls on the lower end of the derrick frame arm. As the basket or receptacle is elevated, link 97¹ continues to slide up the slot 128¹ under the pull exerted by the basket. The overshot control arm 98 pivots counterclockwise in response to the swinging movement of the derrick arms and frame. Thus, as the derrick frame is elevated, the basket is maintained substantially level as the action of the slide link connection 97¹ permits the basket to continue to tilt forward to compensate for its upward swing on the ends of the derrick frame. The upper limit of slot 128¹ is reached when the basket has been elevated to about two thirds of the way to a vertical overshot position. For any position up to this two-thirds position, the basket may be dumped forward of the tractor. Dumping takes place when the trip control cable 123 is pulled to release latch 109. This permits slide 110 to slide downwardly and allow the basket to dump. As it slides down, it takes up on cable 106 which runs through pulley 105 on the end of the trip return rod 100. Spring 102 is compressed and after the basket has dumped its load, the spring tends to return the rod 100 to its normal position, thus pulling on the basket control cable 124 to return the basket. To assist the basket to return to normal after dumping its load, the trip return mechanism 80, see Figure 5, also exerts a backward pull on the basket.

If it is desired not to make a forward dump with the load, as just described, but to overshoot the load to the rear of the tractor, the basket trip 109 is allowed to remain in locked position while power is continued to be applied to the derrick arms to elevate them to a vertical position. By speeding up on the swing of the derrick arms as they approach the vertical, the load may be given more momentum to throw it further to the rear of the tractor. As the basket approaches the vertical overshot position, a pull is exerted on cable 124 to tip the basket further backward so that the load will rest on the pitcher teeth 70, see Figure 3. This pull on cable 124 results on slide link 97¹ having reached its upward travel at the end of slot 128¹ on the overshot control arm 98 and the pull exerted by the backward pivoting of the control arm 98 which swings under the influence of the derrick frame.

To prevent the basket 60 from tilting fully backward and spilling the load, overshoot stool 140 swings into position under the head of the basket and arrests its backward rotation. This stool is pivoted into supporting position by the pull exerted by spring 136 to rotate it clockwise. As the basket is lowered this stool rotates counterclockwise under the influence of the pull on cable 139. When the basket is in its lowest position, the overshot stool 140 is fully rotated out of the way of the head of the basket and permits the basket to be tilted.

As the derrick frame approaches its vertical overshot position, slack is taken out of arresting cables 153 and the tension springs 155, see Figure 3, tend to snub the backward swing of the derrick frame. At the same time, the load on the derrick frame is automatically transferred from the tractor to the ground through the stabilizer generally indicated at 160. Arm 161 which is attached at its upper end to a mid point on the derrick axle frame 50 now extends substantially vertical and through its foot plate 164 at its lower end, transfers the load to the ground.

While a hay basket or receptacle has been shown with this loader, a scoop, such as a manure basket, can be substituted for the basket. The form and arrangement of parts provides a loader which is stable and safe for all positions of placing the load forward or overshooting it in the rear of the tractor. The loader is easy to operate and has a minimum of controls for the operator to handle.

We claim:

1. Apparatus of the character described comprising a tractor; a derrick frame pivoted to said tractor to swing on a horizontal axis spaced above and to the rear of the center of gravity of said tractor; means for applying force to said frame below said pivot axis to swing the forward end of said frame upwardly from ground engaging to vertical overshot position; a gathering receptacle pivoted on a horizontal axis to the forward end of said frame; said receptacle having a normally substantially horizontal bottom; and means for retaining said bottom substantially horizontal during a substantial portion of the swinging movement of said frame, comprising an overshot control arm pivotally mounted at its lower end on said tractor and formed with an upwardly and rearwardly extending slot at its upper end, a slidable member connecting said receptacle above its pivoted axis with said slot and slidable therein in response to pivotal movement of said overshot control arm, and means responsive to swinging movement of said frame to cause pivoted movement of said control arm in the same general direction of swing as said frame; said overshot control arm acting on said slidable member connecting it with said receptacle to cause said receptacle to tip backwards as the derrick frame approaches and reaches a vertical overshot position.

2. Apparatus constructed in accordance with claim 1 wherein said means for applying force to swing said frame lies substantially in a horizontal plane.

3. Apparatus constructed in accordance with claim 1 wherein said means connecting said receptable with said slot in the overshot control arm is provided with a trip releasing said receptacle for forward dumping movement.

4. Apparatus constructed in accordance with claim 1 wherein said gathering receptacle has a head portion extending rearwardly of its pivotal axis mounting and including means for limiting the backward rotation of said receptacle about its axis as said derrick frame is swung to vertical overshooting position, comprising an overshoot stool pivotally mounted towards the end of said derrick frame beneath said head portion of the receptacle, and means responsive to swinging movement of said frame for pivoting said stool into position under said receptacle head portion as said frame swings upwardly and out from under said receptacle head as said frame swings downwardly.

5. Apparatus constructed in accordance with claim 1 provided with stabilizing means responsive to swinging movement of said derrick frame and transferring forces from said derrick frame to the ground supporting said tractor as said derrick frame swings to a vertical overshot position.

6. Apparatus constructed in accordance with claim 1 wherein said gathering receptacle has a head portion extending rearwardly of its pivotal axis mounting and including saddles resiliently mounted at the forward end of said tractor for engagement with the head portion of said receptacle.

7. Apparatus constructed in accordance with claim 1 provided with means for arresting the swinging movement of said derrick frame as it swings into a vertical overshot position, comprising a resilient member connected at one end to said tractor and at its other end to said derrick frame.

8. In combination with a tractor, a derrick frame; means mounted on the tractor for supporting said frame for turning movement on a horizontal axis a substantial distance above the ground, said frame comprising a transverse axle frame pivotally supported on said support means and substantially parallel derrick arms of obtuse shape supported at their vertex by said axle frame, said derrick arms forward portion being substantially longer than their rear downwardly extending portion, a material receptacle pivoted to the forward portion of said frame, said receptacle having a normally substantially horizontal bottom, means responsive to swinging movement of said frame for maintaining said bottom substantially horizontal during a substantial portion of the swinging movement of said frame, and causing said receptacle to tip backwards as the derrick frame approaches a vertical overshot position, means responsive to swinging movement of said frame for arresting said receptacle's backward rotation about its axis as said frame is elevated to vertical overshot position, a trip releasable to release said receptacle to dump by gravity at the forward end of said tractor, means for swinging said frame about its pivot axis, and means for arresting the swinging movement of said derrick frame as it assumes a vertical overshot position, the whole combination having a center of gravity that remains forward of the rear axle of the tractor for all positions of the derrick frame from ground engaging lower position to vertical overshot position.

9. Apparatus constructed in accordance with claim 8 wherein said means for swinging said derrick frame about its pivot axis comprises a force applied at the outward ends of said rear portions of the derrick arms which acts in a substantially horizontal plane.

10. Apparatus constructed in accordance with claim 8 wherein said gathering receptacle has a head portion extending rearwardly of its pivotal axis mounting and has pitcher teeth extending substantially transversely and upwardly from said bottom of the receptacle, said means for retaining said receptacle substantially horizontal during a substantial portion of the swinging movement of said frame comprises an overshot control arm pivotally mounted at its lower end on said mounting means on the tractor for said derrick frame and is formed with an upwardly and rearwardly extending slot at its upper end, a slidable member connecting said receptacle above its pivotal axis with said slot and slidable therein in response to pivotal movement of said overshot control arm and means responsive to swinging movement of said frame to cause pivotal movement of said overshot control arm in the same general direction of swing as said frame, said overshot control arm acting on said slidable member connecting it with the receptacle to cause said receptacle to tip backwards as the derrick frame approaches and reaches a vertical overshot position.

11. Apparatus constructed in accordance with claim 8 wherein said means for retaining said receptacle substantially horizontal during a substantial portion of the swinging movement of said derrick frame, comprises a control arm pivotally mounted at its lower end on said mounting means on the tractor for said derrick frame and formed with an upwardly and rearwardly extending slot at its upper end, a slidable member connected at one end to said receptacle above its pivotal axis and at its other end to said slot in the control arm for sliding movement therein in response to pivotal movement of said control arm and means responsive to swinging movement of said derrick frame to cause pivotal movement of said control arm in the same general direction of swing as said derrick frame.

12. Apparatus constructed in accordance with claim 8 wherein said gathering receptacle has a head portion extending rearwardly of its pivotal axis mounting and said means for arresting said receptacle's backward rotation, comprises an overshot stool pivotally mounted towards the end of said derrick frame beneath said head portion of the receptacle and means responsive to swinging movement of said derrick frame for pivoting said stool into position under said head portion as said derrick frame swings upwardly and out from under said head portion as said frame swings downwardly.

13. Apparatus constructed in accordance with claim 8 provided with means for tilting said receptacle backward and forward on its pivotal mounting axis when said receptacle rests in its lowest downward swung position on said derrick frame, comprising a control lever pivotally mounted at one end on said means supporting said derrick frame, means connecting the other end of said control lever with said receptacle for imparting tilting movement thereto, a cable connecting said control lever with a take up means arranged at the rear end of said derrick frame whereby force applied to said take up means tightens said cable and causes said control lever to pivot backwardly and said receptacle to be tilted backward and release of force on said take up means slackens said cable and causes said control lever to pivot forwardly and said receptacle to tilt forwardly, said application of force to said take up means being at the same position of said means for swinging said derrick frame about its pivot axis.

14. In an apparatus of the character described for use with a derrick frame pivotally mounted on a derrick frame support on a tractor and having a receptacle pivotally mounted on the derrick frame for forward and rearward dumping movement, a receptacle control assembly comprising a guide shaft mounted on said derrick frame for slidable movement thereon, a basket trip shaft mounted adjacent said guide shaft and slidable relative to said guide shaft, a collar slidably mounted on said guide shaft, control means connecting said collar and said receptacle, means connecting said collar with said trip shaft whereby movement of said collar in response to pivotal forward dumping movement of said receptacle moves said trip shaft relative to said guide shaft in one direction, means for moving said trip shaft relative to said guide shaft in a direction opposite to that imparted by said slidable collar whereby said receptacle is pivoted in a reverse direction to said forward dumping movement, locking means for holding and releasing said collar on said guide shaft and means for moving said slidable guide shaft relative to said basket trip shaft whereby motion is imparted to said collar in its locked position on said guide shaft to impart rearward dumping movement to said receptacle.

15. In combination with a tractor; a derrick frame; means connected to said tractor for supporting said derrick frame for pivotal movement about a horizontal axis a substantial distance above and to the rear of said tractor; a material receptacle pivotally supported on the forward end of said derrick frame; a power cable system for rotating said derrick frame; a ground engaging member pivotally connected toward the rear of said derrick frame movable into ground engaging position when said derrick frame is elevated to a substantial vertical position; a material receptacle control assembly slidably mounted on said derrick frame for transmitting motion to said receptacle; said control assembly having releasable means for allowing said receptacle to dump; a pivotally mounted control arm responsive to swinging movement of said derrick frame; and means connecting said pivotally mounted control arm with said slidably mounted material receptacle control assembly, whereby movement of said pivoted control arm permits said receptacle to tilt and remain in a horizontal position while being raised or lowered by said derrick frame through a substantial portion of its swing and whereby said receptacle is caused to tilt backwards on reaching a vertical overshot position.

16. In an apparatus of the character described for use on a derrick frame support mountable on a tractor, a derrick frame adapted for pivotal mounting on the derrick frame support and comprising substantially parallel extending derrick arms of obtuse angular shape having a forward portion of substantially greater length than the remaining rearwardly and downwardly extending portion thereof, a strut member connected to the juncture of said forward and rearward portions of each derrick arm and extending on the opposite side thereof from the obtuse angle formed by said forward and rearward portions, a stay rod having its ends connected to the outer ends of each of said derrick arm portions and at an intermediate portion of the stay rod connected to the outer end of said strut member on each derrick arm, and a rectangular shaped frame member having its longer axis extending transversely and connecting with said derrick arms at said strut members and having pivot means for mounting said derrick frame on said derrick frame support.

EDGAR W. HUDSON.
GLEN L. HUDSON.

REFERENCES CITED

The following references are of record in the file of this patent:

UNITED STATES PATENTS

| Number | Name | Date |
| --- | --- | --- |
| 1,371,344 | Brackett | Mar. 15, 1921 |
| 1,439,948 | Cole et al. | Dec. 26, 1922 |
| 1,791,979 | Sharp | Feb. 10, 1931 |
| 2,288,496 | Swedberg | June 30, 1942 |
| 2,322,487 | Toftey | June 22, 1943 |
| 2,351,104 | Carter | June 13, 1944 |
| 2,441,310 | Coldwell et al. | May 11, 1948 |
| 2,456,879 | Kucera | Dec. 21, 1948 |
| 2,517,582 | Lull | Aug. 8, 1950 |